(12) United States Patent
Macdonald et al.

(10) Patent No.: US 11,542,840 B2
(45) Date of Patent: Jan. 3, 2023

(54) HYBRID POWER GENERATION SYSTEMS

(71) Applicant: Hamilton Sundstrand Corporation, Charlotte, NC (US)

(72) Inventors: Malcolm Macdonald, West Hartford, CT (US); Ram Ranjan, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/307,764

(22) Filed: May 4, 2021

(65) Prior Publication Data

US 2021/0340884 A1    Nov. 4, 2021

Related U.S. Application Data

(60) Provisional application No. 63/019,784, filed on May 4, 2020.

(51) Int. Cl.
| | |
|---|---|
| *F01K 25/10* | (2006.01) |
| *F02C 1/10* | (2006.01) |
| *F02C 6/00* | (2006.01) |
| *F02C 9/00* | (2006.01) |
| *H01M 8/04014* | (2016.01) |
| *H01M 8/04298* | (2016.01) |

(52) U.S. Cl.
CPC .............. *F01K 25/103* (2013.01); *F02C 1/10* (2013.01); *F02C 6/003* (2013.01); *F02C 9/00* (2013.01); *H01M 8/04022* (2013.01); *H01M 8/04298* (2013.01)

(58) Field of Classification Search
CPC ............ F01K 25/103; H01M 8/04022; H01M 8/04298; F02C 6/003; F02C 1/10; F02C 9/00
USPC .................... 60/655, 650, 682–684; 429/400
See application file for complete search history.

(56) References Cited

U.S. PATENT DOCUMENTS

| | | | | |
|---|---|---|---|---|
| 6,365,290 B1* | 4/2002 | Ghezel-Ayagh | ........ | H01M 8/00 429/423 |
| 8,047,006 B2* | 11/2011 | Hotto | .................. | H01M 8/0618 60/780 |
| 9,014,791 B2* | 4/2015 | Held | ........................ | F02C 1/06 600/476 |
| 9,212,625 B2 | 12/2015 | Shelley | | |

(Continued)

FOREIGN PATENT DOCUMENTS

| | | |
|---|---|---|
| CN | 109915220 B | 3/2020 |
| EP | 3048281 B1 | 4/2017 |

(Continued)

OTHER PUBLICATIONS

Extended European search report issued in corresponding EP application No. 21172119.6, dated Oct. 5, 2021.

*Primary Examiner* — Hoang M Nguyen
(74) *Attorney, Agent, or Firm* — Locke Lord LLP; Daniel J. Fiorello; Gabrielle Gelozin

(57) ABSTRACT

A hybrid powerplant can include a fuel cell cycle system configured to generate a first power using a fuel and an oxidizer. The powerplant can also include a supercritical carbon dioxide ($sCO_2$) cycle system operatively connected to the fuel cell cycle to receive heat from the fuel cell cycle to cause the $sCO_2$ cycle system to generate a second power.

18 Claims, 5 Drawing Sheets

(56) References Cited

U.S. PATENT DOCUMENTS

| | | | | |
|---|---|---|---|---|
| 2002/0174659 A1* | 11/2002 | Viteri | ............... | H01M 8/04022 |
| | | | | 60/780 |
| 2006/0228596 A1* | 10/2006 | Campbell | ......... | H01M 8/04701 |
| | | | | 307/53 |
| 2012/0117979 A1* | 5/2012 | Facchinetti | ............... | F02C 3/28 |
| | | | | 60/783 |
| 2020/0313207 A1* | 10/2020 | Milcarek | ............... | H01M 8/243 |
| 2020/0370446 A1* | 11/2020 | Mook | ................... | B33Y 80/00 |

FOREIGN PATENT DOCUMENTS

| | | | |
|---|---|---|---|
| FR | 3050720 | B1 | 4/2018 |
| GB | 2548123 | A | 9/2017 |
| KR | 101603252 | B1 | 3/2016 |
| KR | 20160066539 | A | 6/2016 |
| KR | 101984122 | B1 | 5/2019 |
| KR | 102029421 | B1 | 10/2019 |

\* cited by examiner

HYBRID POWER GENERATION SYSTEMS

CROSS-REFERENCE TO RELATED APPLICATIONS

This application claims priority to and the benefit of U.S. Provisional Application No. 63/019,784, filed May 4, 2020, the entire contents of which are herein incorporated by reference in their entirety.

FIELD

This disclosure relates to powerplants, for example, hybrid power generation systems.

BACKGROUND

Changes to conventional jet engine cycles have been incremental, e.g., with geared turbofan thermal efficiency of about 52%. Eco-friendly flight is becoming increasingly important as governments increase regulations on emissions (e.g., NOx, $CO_2$, sulphur oxides, etc.) near cities. In addition, regulations on total emitted $CO_2$ throughout a mission are becoming more important. Power generation cycles that have less emissions, that have more efficient power generation, and that can decrease mission fuel burn would be both financially attractive and would provide a path to meeting emissions standards.

Such conventional methods and systems have generally been considered satisfactory for their intended purpose. However, there is still a need in the art for improved power generation systems. The present disclosure provides a solution for this need.

SUMMARY

A hybrid powerplant can include a fuel cell cycle system configured to generate a first power using a fuel and an oxidizer. The powerplant can also include a supercritical carbon dioxide ($sCO_2$) cycle system operatively connected to the fuel cell cycle to receive heat from the fuel cell cycle to cause the $sCO_2$ cycle system to generate a second power.

The fuel cell cycle system can include a fuel cell (e.g., a solid oxide fuel cell or any other suitable fuel cell) connected to an oxidizer line and a fuel line, and a combustor downstream of a fuel cell to receive partially spent fuel from the fuel cell and to combust the partially spent fuel. The $sCO_2$ cycle system can be thermally connected to the combustor to receive heat from the combustor.

The fuel cell cycle system can include a compressor configured to receive oxidizer and compress the oxidizer upstream of the fuel cell. The fuel cell cycle system can include a turbine downstream from the combustor to receive exhaust flow and operatively connected (e.g., via a shaft) to the compressor to turn the compressor.

The fuel cell cycle system can include a fuel cell system recuperator heat exchanger connected between the compressor and the fuel cell, and between the combustor and the turbine, and configured to exchange heat from an exhaust flow of the combustor to the oxidizer upstream of the fuel cell. In certain embodiments, the powerplant can include a supplemental fuel line connected to the combustor to provide supplemental fuel to the combustor.

The $sCO_2$ cycle system can operate in a Brayton cycle. For example, the $sCO_2$ cycle system can include a work turbine connected to a fluid line and configured to extract work from a working fluid of the $sCO_2$ cycle system. The work turbine can be configured to receive heated flow from the combustor of the fuel cell cycle system.

The $sCO_2$ cycle system can include a working fluid compressor operatively connected upstream of the combustor relative to the combustor and configured to compress the working fluid before the working fluid receives heat from the combustor. The work turbine can be operatively connected (e.g., via a shaft) to the working fluid compressor to turn the working fluid compressor.

The $sCO_2$ cycle system can include a ram air heat exchanger connected to the fluid line between the working fluid compressor and the work turbine and can be configured to exchange heat between ram air and the working fluid. The $sCO_2$ cycle system can include a first recuperator heat exchanger connected to the fluid line between the combustor and the working fluid compressor, and to the fluid line between the work turbine and the ram air heat exchanger such that the first recuperator heat exchanger is configured to exchange heat between the working fluid outlet from the work turbine and the working fluid downstream of the working fluid compressor.

In certain embodiments, the $sCO_2$ cycle system can include a secondary compressor operatively connected to the fluid line in parallel with the working fluid compressor downstream of both outlets of the recuperator heat exchanger. The secondary compressor can be configured to receive and recompress a portion of the working fluid output from the first recuperator heat exchanger and output the recompressed working fluid to the fluid line upstream of the combustor. In certain embodiments, the $sCO_2$ cycle system can include a second recuperator heat exchanger connected to the fluid line between the first recuperator heat exchanger and the working fluid compressor and between the working fluid compressor and the first recuperator heat exchanger relative to the direction of flow.

In certain embodiments, the oxidizer can be air. Any other suitable oxidizer is contemplated herein (e.g., for a solid oxide fuel cell). In certain embodiments, the hybrid powerplant can be an aircraft powerplant configured to be attached to an aircraft.

In certain embodiments, the first power is electrical power (e.g., for use by an electric motor system and/or an aircraft electrical system) output from the fuel cell. The second power can be mechanical power output from the $sCO_2$ cycle system. The powerplant can include a generator connected to the $sCO_2$ cycle system (e.g., mechanically connected to the work turbine) to convert the mechanical power into electrical power (e.g., for use by an electric motor system and/or an aircraft electrical system).

The powerplant can include a controller. In certain embodiments, the controller can be configured to control the fuel cell cycle system to output a constant power and the $sCO_2$ cycle system to output a variable power. In certain embodiments, the controller can be configured to control the fuel cell cycle system and the $sCO_2$ cycle system to output a constant power and to control another power source (e.g., a battery) for variable power.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
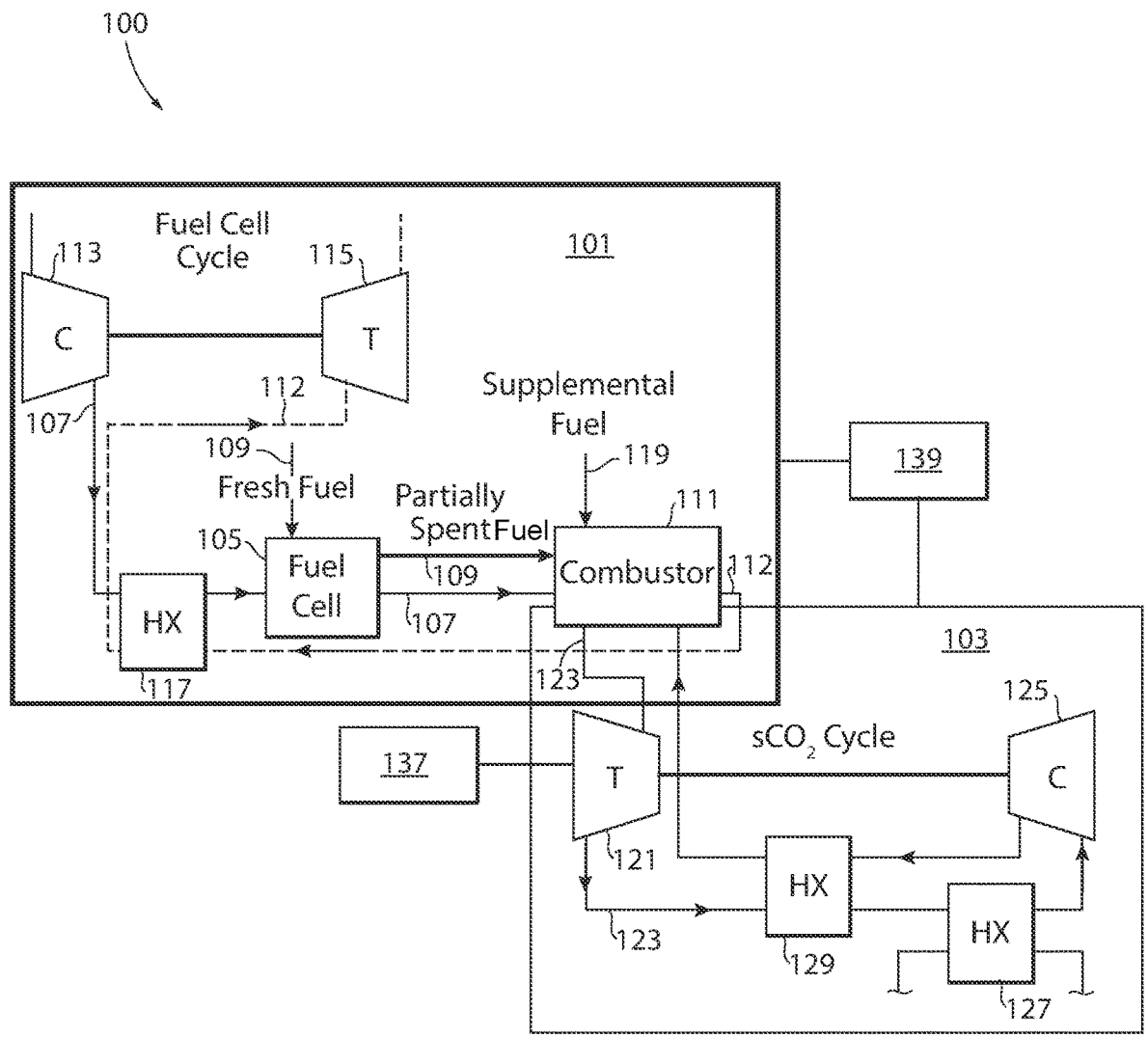
FIG. 1 is a schematic diagram of an embodiment of a hybrid powerplant in accordance with this disclosure.

Reference will now be made to the drawings wherein like reference numerals identify similar structural features or aspects of the subject disclosure. For purposes of explanation and illustration, and not limitation, an illustrative view of an embodiment of a hybrid powerplant in accordance with the disclosure is shown in FIG. 1 and is designated generally by reference character 100. Other embodiments and/or aspects of this disclosure are shown in FIGS. 2-5.

Referring to FIG. 1, a hybrid powerplant 100 can include a fuel cell cycle system 101 configured to generate a first power (e.g., to turn an air mover) using a fuel and an oxidizer (e.g., air). The powerplant 100 can also include a supercritical carbon dioxide (sCO$_2$) cycle system 103 operatively connected to the fuel cell cycle 101 to receive heat from the fuel cell cycle 101 to cause the sCO$_2$ cycle system 103 to generate a second power.

The fuel cell cycle system 101 can include a fuel cell 105 (e.g., a solid oxide fuel cell or any other suitable fuel cell) connected to an oxidizer line 107 and a fuel line 109. The fuel cell cycle system 101 can include a combustor 111 (e.g., connected to the fuel line 109 and the oxidizer line 107) downstream of a fuel cell 105 to receive partially spent fuel from the fuel cell 105 and to combust the partially spent fuel. As shown, the sCO$_2$ cycle system 103 can be thermally connected to the combustor 111 to receive heat from the combustor 111.

The fuel cell cycle system 101 can include a compressor 113 configured to receive oxidizer (e.g., air from an air inlet) and compress the oxidizer upstream of the fuel cell. The fuel cell cycle system 103 can include a turbine 115 downstream from the combustor 111 (e.g., connected to an exhaust line 112) to receive exhaust flow (e.g., to extract work therefrom). The turbine 115 can be operatively connected (e.g., via a shaft) to the compressor 113 to turn the compressor 113.

The fuel cell cycle system 103 can include a fuel cell system recuperator heat exchanger 117 connected between the compressor 113 and the fuel cell 105, and between the combustor 113 and the turbine 115, e.g., as shown. The fuel cell system recuperator heat exchanger 117 can be configured to exchange heat from an exhaust flow of the combustor 111 to the oxidizer upstream of the fuel cell 105. In certain embodiments, the powerplant 100 can include a supplemental fuel line 119 connected to the combustor 111 to provide supplemental fuel to the combustor 111.

The sCO$_2$ cycle system 103 can operate in a Brayton cycle. For example, the sCO$_2$ cycle system 103 can include a work turbine 121 connected to a fluid line 123 and configured to extract work from a working fluid (e.g., CO$_2$ in a super critical state) of the sCO$_2$ cycle system 103. The work turbine 121 can be configured to receive heated flow (of the working fluid) from the combustor 111 of the fuel cell cycle system 101. The combustor 111 can be configured to include any suitable passages and/or an attached heat exchanger to allow heat to exchange from the combustor 111 to the working fluid of the sCO$_2$ cycle system 103.

The sCO$_2$ cycle system 103 can include a working fluid compressor 125 operatively connected (to the fluid line 123) upstream of the combustor 111 relative to the combustor 111 and configured to compress the working fluid before the working fluid receives heat from the combustor 111. The work turbine 121 can be operatively connected (e.g., via a shaft as shown) to the working fluid compressor 125 to turn the working fluid compressor 125.

The sCO$_2$ cycle system 103 can include a ram air heat exchanger 127 connected to the fluid line 123 between the working fluid compressor 125 and the work turbine 121 and can be configured to exchange heat between ram air and the working fluid. The sCO$_2$ cycle system 103 can include a first recuperator heat exchanger 129 connected to the fluid line 123 between the combustor 111 and the working fluid compressor 125 (on a compressed side of fluid line 123), and to the fluid line 123 between the work turbine 121 and the ram air heat exchanger 127 such that the first recuperator heat exchanger 129 is configured to exchange heat between the working fluid outlet from the work turbine 121 and the working fluid downstream of the working fluid compressor 125.

Figure 2:
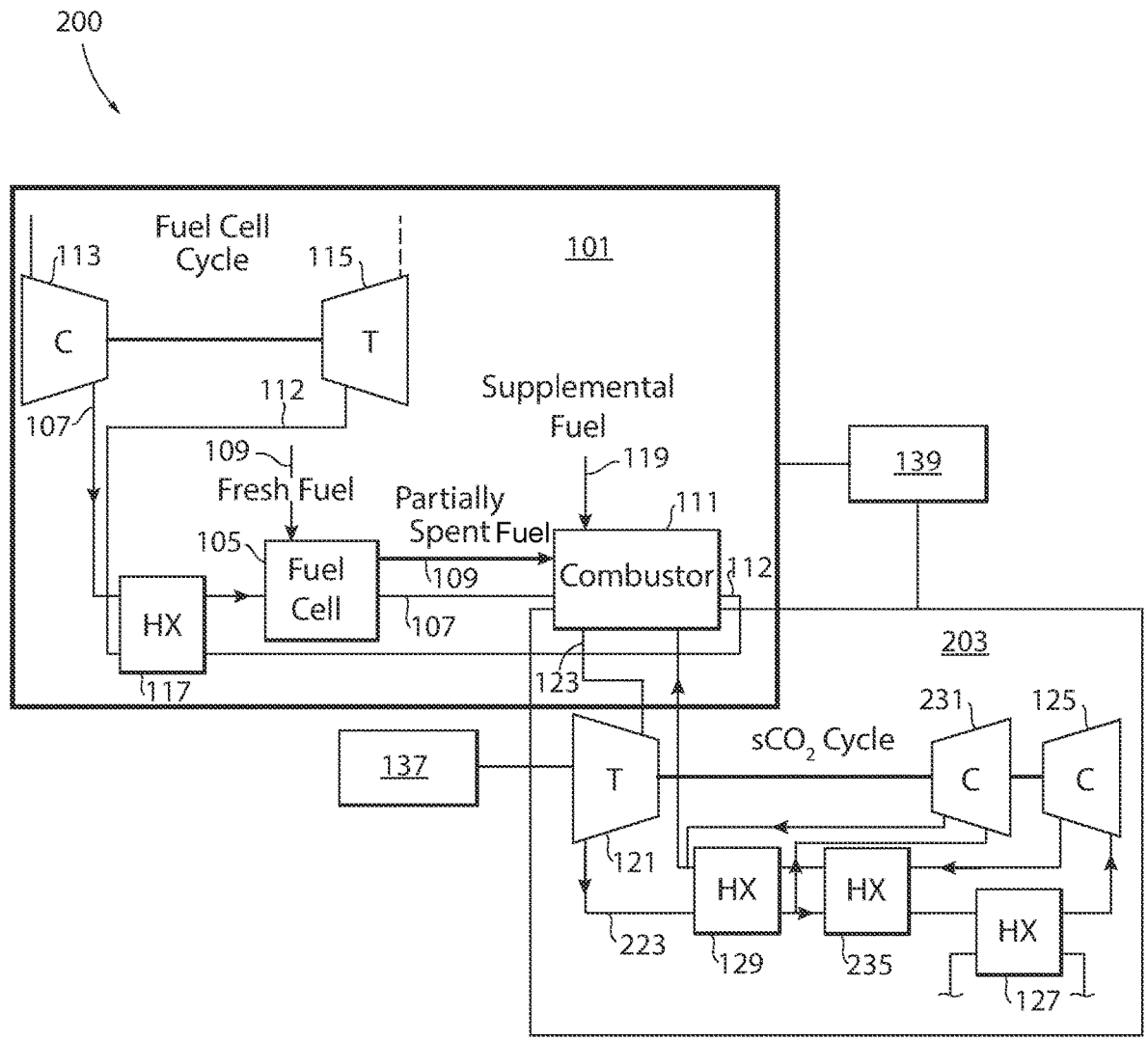
FIG. 2 is a schematic diagram of an embodiment of a hybrid powerplant in accordance with this disclosure.

Referring additionally to FIG. 2, in certain embodiments, the sCO$_2$ cycle system 203 of powerplant 200 can include a secondary compressor 231 operatively connected to the fluid line 223 in parallel with the working fluid compressor 125 downstream of both outlets of the recuperator heat exchanger 129. The secondary compressor 231 can be configured to receive and recompress a portion of the working fluid output from the first recuperator heat exchanger 129 and output the recompressed working fluid to the fluid line 223 upstream of the combustor 111 (e.g., as shown). In certain embodiments, the sCO$_2$ cycle system 203 can include a second recuperator heat exchanger 235 connected to the fluid line 223 between the first recuperator heat exchanger 129 and the working fluid compressor 125 and between the working fluid compressor 125 and the first recuperator heat exchanger 129 relative to the direction of flow (e.g., as shown). As shown, the second recuperator heat exchanger 235 can also be positioned upstream of the ram air heat exchanger 127. The sCO$_2$ cycle system 103, 203 can include any other suitable configuration configured to utilize heat from the fuel cell cycle system 101 to output power.

In certain embodiments, the oxidizer can be air. Any other suitable oxidizer is contemplated herein (e.g., for a solid oxide fuel cell). In certain embodiments, the hybrid powerplant 100 can be an aircraft powerplant configured to be attached to an aircraft.

In certain embodiments, the first power is electrical power (e.g., for use by an electric motor system and/or an aircraft electrical system) output from the fuel cell 105. The second power can be mechanical power output from the sCO$_2$ cycle system 103, 203. The powerplant 100 can include a generator 137 connected to the sCO$_2$ cycle system (e.g., mechanically connected to the work turbine 121) to convert the mechanical power into electrical power (e.g., for use by an electric motor system and/or an aircraft electrical system).

Figure 3:
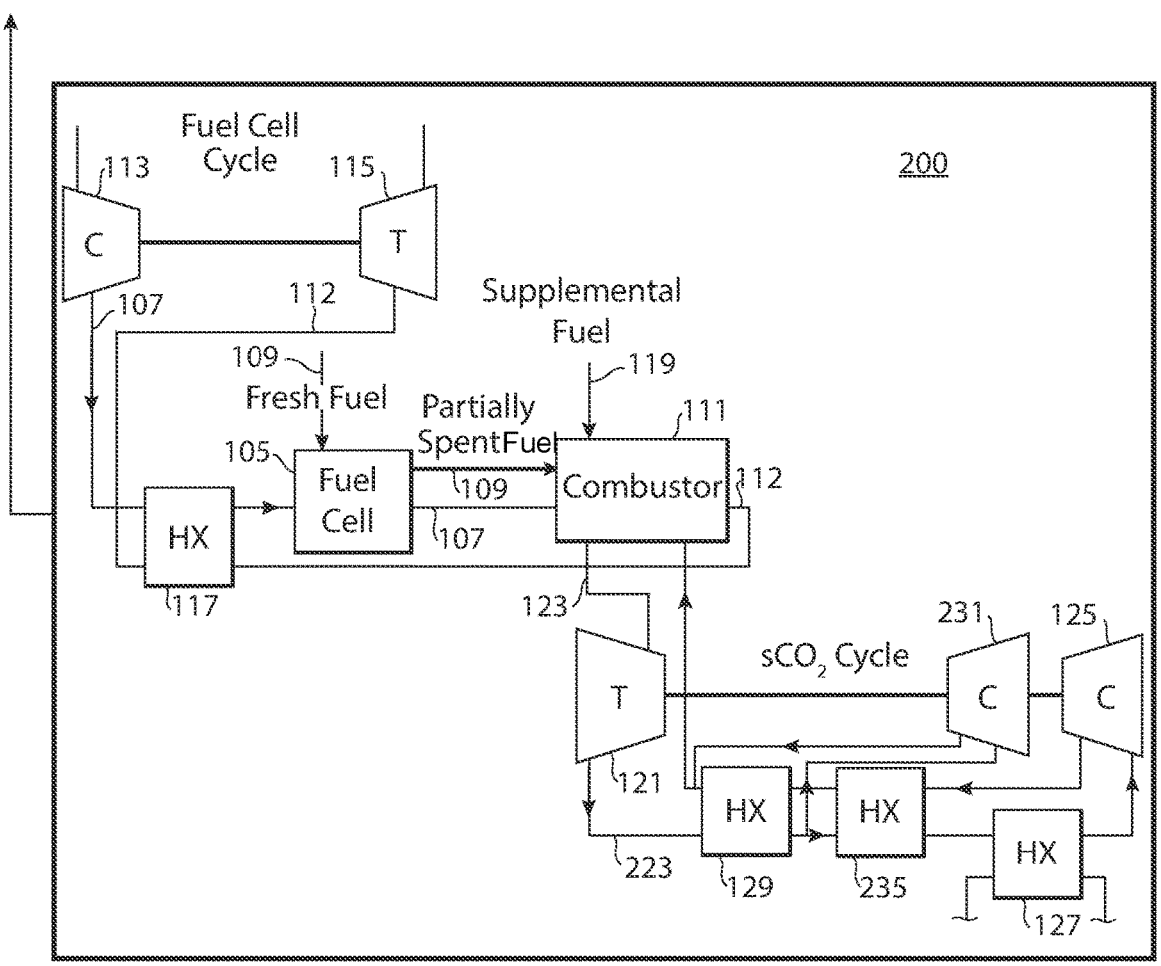
FIG. 3 is a schematic diagram of a control scheme of an embodiment of a hybrid powerplant in accordance with this disclosure.
Figure 4:
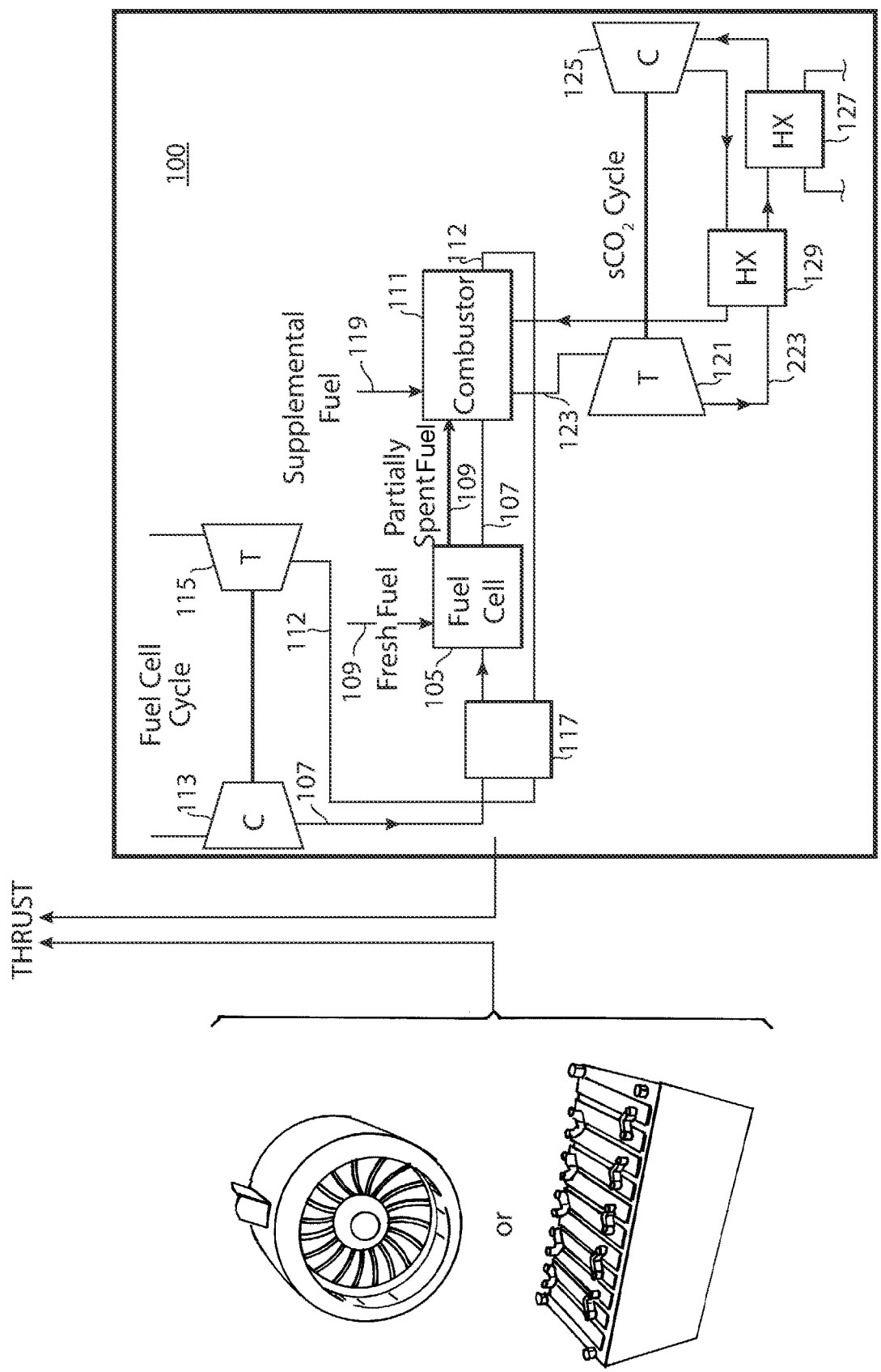
FIG. 4 is a schematic diagram of a control scheme of an embodiment of a hybrid powerplant in accordance with this disclosure.

Referring additionally to FIG. 3, the powerplant 100, 200 can include a controller 139. The controller 139 can include any suitable hardware and/or software configured to perform any suitable disclosed function and/or any other suitable function appreciated by those having ordinary skill in the art in view of this disclosure. In certain embodiments, the controller 139 can be configured to control the fuel cell cycle system 101 to output a constant power and the $sCO_2$ cycle system 103, 203 to output a variable power (e.g., such that the powerplant 100, 200 generates a thrust). Referring additionally to FIG. 4, in certain embodiments, the controller 139 can be configured to control the fuel cell cycle system 101 and the $sCO_2$ cycle system 103, 203 to output a constant power and to control another power source (e.g., a battery, a turbomachine) for variable power (e.g., such that a total thrust between powerplant 100, 200 and the other power source generates a total thrust). Any other suitable control scheme is contemplated herein.

In accordance with certain embodiments, air can flow into the compressor, be compressed, flows to an optional recuperating heat exchanger to be additionally heated, and then flow to a fuel cell where the air enters the fuel cell as an oxidizer (oxygen in the air) to oxidize fresh fuel (e.g., LNG, H2, Jet-A) for example. The fuel cell here can be a solid oxide fuel cell, but can be any suitable fuel cell (e.g., a device that can transfer ions from one stream to another stream) is contemplated herein. Certain embodiments of a fuel cell can be configured to operate at temperatures of above about 600 degrees C., for example. The compressor and/or recuperator can be configured to heat the air to a suitable temperature to allow the desired fuel cell to function. The fuel cell can produce electricity as appreciated by those having ordinary skill in the art, which can be used for powering a motor (e.g., for propulsion) and/or any other suitable electrical use.

Partially spent fuel and air separately exit the fuel cell and can get injected into the combustor with optional supplemental fuel (e.g., for increasing temperature of combustor/outlet to make the $sCO_2$ cycle more efficient). The combustor can be much smaller with less fuel to burn because less heat is needed from the combustor as the fuel cell can do most of the energy conversion. In certain embodiments, the combustor can be about 20% to about 30% of the size of a traditional combustor, for example. The combustion products leave compressor, can travel to an optional recuperating heat exchanger, and can power the turbine to turn the compressor.

The combustor can receive inlet air at about 800 degrees C. from the fuel cell and can outlet exhaust at about 950 degrees C. to about 1000 degrees C. The combustor can act as a heat exchanger, and the $sCO_2$ line can be heated to about 750 degrees C. in certain embodiments.

Embodiments can include dual compressors and dual recuperator heat exchangers in the $sCO_2$ cycle system. The $sCO_2$ cycle system can attach to a generator to generate electricity that can be used to also drive a motor or for other electronics, however, embodiments could mechanically connect to a propulsion device (e.g., a propeller).

Figure 5:
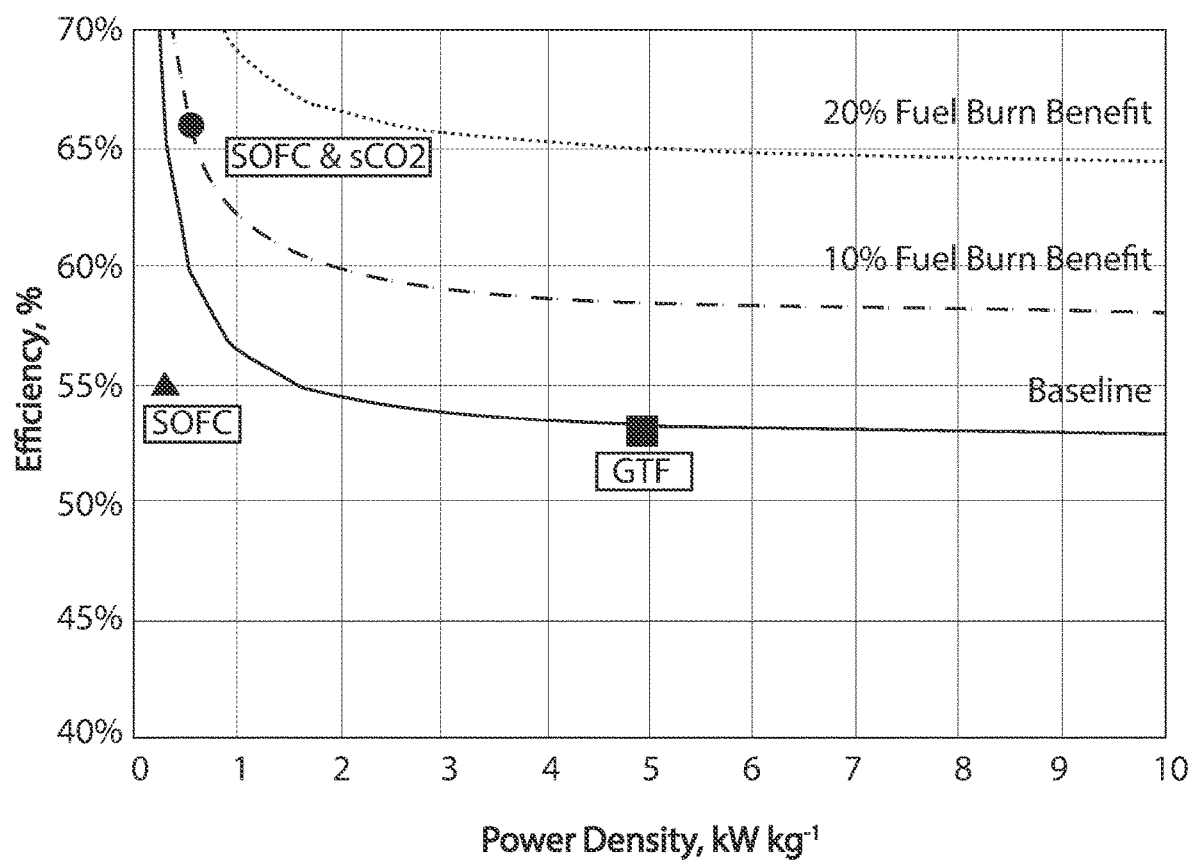
FIG. 5 is a chart showing efficiency of one or more embodiments of this disclosure against a geared turbofan and a fuel cell system.

Referring additionally to FIG. 5, embodiments can be more efficient while maintaining an acceptable power-to-weight ratio. For example, using a fuel cell cycle system, the fuel cell can replace a traditional combustor, and the combustor 111, e.g., used for another system (e.g., an $sCO_2$ cycle system), can be much smaller and lead to a power-to-weight benefit.

Embodiments can convert fuel to electricity to power an electric motor, e.g., for propulsion and/or on board systems (e.g., an environmental control system, avionics, etc.)

Existing aircraft engines have high power density and low thermal efficiency, e.g., about 52%. To achieve a fuel burn benefit, the powerplant must be either lighter weight or more thermally efficient. Higher power density than existing technology brings small benefits.

Certain embodiments include a hybrid cycle where a fuel cell is combined with a combustion stage where the unconverted fuel from the fuel cell is burned to a high temperature, and a bottoming supercritical $CO_2$ cycle that accepts the high temperature heat and converts it to power. The supercritical $CO_2$ cycle can increase the power density of the combined cycle and can increase the overall power generation efficiency.

In certain embodiments, air can be taken from the low temperature and low pressure ambient that exists at altitude (e.g., 30,000+ ft). The air can be taken from the outside of the aircraft by a scoop and can be piped and/or pumped with or without compressing the fluid through a recuperative heat exchanger. The air can exchange heat with the air waste stream and increase in temperature. The air can then pass through the fuel cell stack where it reacts with a reformed fuel (LNG, H2, or Jet-A etc.) to produce power, and, during this process, it can increase in temperature. The unburned fuel from the fuel cell can pass to the combustor where it can be burned at a relatively low temperature to minimize NOx (and other) emissions. Supplemental fuel can be supplied to the combustor to reach the desired temperature at the exit of the combustor. The combustion products can then be used to heat a supercritical $CO_2$ cycle.

The supercritical $CO_2$ cycle can operate like a Brayton cycle where the supercritical $CO_2$ is compressed and then exchanges heat in a recuperator heat exchanger where its temperature increases and then exchanges heat with the heated air stream from the combustor. The heated supercritical $CO_2$ can pass through a turbine to generate power and to power a supercritical $CO_2$ compressor. The cycle can complete with the working fluid passing through a recuperator heat exchanger and then cooling in a heat exchanger with ambient air. Certain embodiments of the $sCO_2$ cycle system can have a recompression stage, which can increase cycle efficiency compared to the standard Brayton cycle operation.

In accordance with at least one aspect of this disclosure, the fuel cell can operate at a constant power load throughout the flight envelope and the supercritical $CO_2$ cycle can supply variable power to the system. At Cruise the supercritical $CO_2$ cycle can be throttled back to provide part power, e.g. about 20-30% of power required and the fuel cell can provide about 80-70%. In this mode, the fuel cell can provide the majority of power, thus resulting in a higher efficiency mode of operation. In certain embodiments, on take-off and climb, additional supplemental fuel can be supplied to the combustor, and therefore more heat can be supplied to the supercritical $CO_2$ loop to generate more power. Thus, on take-off and climb, more power can be extracted from the supercritical $CO_2$ loop (e.g., greater than about 50% of total power).

In accordance with at least one aspect of this disclosure, the fuel cell and supercritical $CO_2$ cycle can operate at a constant power load throughout the flight envelope. Another power source can be used for other mission segments, e.g., take-off and climb. During take-off and climb a higher power load may be required than the hybrid powerplant can alone provide in certain embodiments. The fuel cell and supercritical CO2 cycle can provide a base load during this segment of the flight, for example. The additional load can be provided by another power source, e.g., an engine on the wing and/or a stored energy source such as a battery bank that supplies power to a fan producing thrust. Two or more power sources can provide power throughout the mission segments of a flight. The fuel cell and supercritical $CO_2$ cycle can provide a base load throughout the flight envelope that can be unchanging with mission segment.

Once the aircraft is at peak altitude, the additional power source used during take-off and climb will can be switched off and the load required to provide thrust during the cruise segment of the flight can be provided by the fuel cell and supercritical $CO_2$ cycle, e.g., operating a continuous power. The hybrid powerplant can also be used to supply power to electric sub-systems.

Embodiments allow power generation that is more efficient than current technologies and can be a cleaner way to generate power, lower noxious emissions for example. Onboard power generation and distribution can have the benefit that a more flexible/efficient propulsion mode is made possible than the conventional jet engine on a wing mode that is currently employed.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A hybrid powerplant, comprising:
    a fuel cell cycle system configured to generate a first power using a fuel and an oxidizer; and
    a supercritical carbon dioxide ($sCO_2$) cycle system operatively connected to the fuel cell cycle to receive heat from the fuel cell cycle to cause the $sCO_2$ cycle system to generate a second power, wherein the fuel cell cycle system includes a fuel cell connected to an oxidizer line and a fuel line, and a combustor downstream of a fuel cell to receive partially spent fuel from the fuel cell and to combust the partially spent fuel, wherein the $sCO_2$ cycle system is thermally connected to the combustor to receive heat from the combustor, wherein the fuel cell cycle system includes a compressor configured to receive oxidizer and compress the oxidizer upstream of the fuel cell.

2. The powerplant of claim 1, wherein the fuel cell cycle system includes a turbine downstream from the combustor to receive exhaust flow and operatively connected to the compressor to turn the compressor.

3. The powerplant of claim 2, wherein the fuel cell cycle system includes a fuel cell system recuperator heat exchanger connected between the compressor and the fuel cell, and between the combustor and the turbine, and configured to exchange heat from an exhaust flow of the combustor to the oxidizer upstream of the fuel cell.

4. A hybrid powerplant, comprising:
    a fuel cell cycle system configured to generate a first power using a fuel and an oxidizer; and
    a supercritical carbon dioxide ($sCO_2$) cycle system operatively connected to the fuel cell cycle to receive heat from the fuel cell cycle to cause the $sCO_2$ cycle system to generate a second power, wherein the fuel cell cycle system includes a fuel cell connected to an oxidizer line and a fuel line, and a combustor downstream of a fuel cell to receive partially spent fuel from the fuel cell and to combust the partially spent fuel, wherein the $sCO_2$ cycle system is thermally connected to the combustor to receive heat from the combustor; and
    a supplemental fuel line connected to the combustor to provide supplemental fuel to the combustor.

5. The powerplant of claim 1, wherein the $sCO_2$ cycle system is operates in a Brayton cycle.

6. The powerplant of claim 1, wherein the $sCO_2$ cycle system includes a work turbine connected to a fluid line and configured to extract work from a working fluid of the $sCO_2$ cycle system, wherein the work turbine is configured to receive heated flow from the combustor of the fuel cell cycle system.

7. The powerplant of claim 6, wherein the $sCO_2$ cycle system includes a working fluid compressor operatively connected upstream of the combustor relative to the combustor and configured to compress the working fluid before the working fluid receives heat from the combustor.

8. The powerplant of claim 7, wherein the work turbine is operatively connected to the working fluid compressor to turn the working fluid compressor.

9. The powerplant of claim 8, wherein the $sCO_2$ cycle system includes a ram air heat exchanger connected to the fluid line between the working fluid compressor and the work turbine and configured to exchange heat between ram air and the working fluid.

10. The powerplant of claim 8, wherein the $sCO_2$ cycle system includes a first recuperator heat exchanger connected to the fluid line between the combustor and the working fluid compressor, and to the fluid line between the work turbine and the ram air heat exchanger such that the first recuperator heat exchanger is configured to exchange heat between the working fluid outlet from the work turbine and the working fluid downstream of the working fluid compressor.

11. The powerplant of claim 10, wherein the $sCO_2$ cycle system includes a secondary compressor operatively connected to the fluid line in parallel with the working fluid compressor downstream of both outlets of the recuperator heat exchanger, the secondary compressor configured to receive and recompress a portion of the working fluid output from the first recuperator heat exchanger and output the recompressed working fluid to the fluid line upstream of the combustor.

12. The powerplant of claim 11, wherein the $sCO_2$ cycle system includes a second recuperator heat exchanger connected to the fluid line between the first recuperator heat exchanger and the working fluid compressor and between the working fluid compressor and the first recuperator heat exchanger relative to the direction of flow.

13. The powerplant of claim 1, wherein the oxidizer is air.

14. The powerplant of claim 13, wherein the hybrid powerplant is an aircraft powerplant configured to be attached to an aircraft.

15. The powerplant of claim 14, wherein the first power is electrical power output from the fuel cell and the second power is mechanical power output from the $sCO_2$ cycle system.

16. The powerplant of claim 15, further comprising a generator connected to the $sCO_2$ cycle system to convert the mechanical power into electrical power.

17. A hybrid powerplant, comprising:
a fuel cell cycle system configured to generate a first power using a fuel and an oxidizer; and
a supercritical carbon dioxide ($sCO_2$) cycle system operatively connected to the fuel cell cycle to receive heat from the fuel cell cycle to cause the $sCO_2$ cycle system to generate a second power;
and a controller configured to control the fuel cell cycle system to output a constant power and the $sCO_2$ cycle system to output a variable power.

18. A hybrid powerplant, comprising:
a fuel cell cycle system configured to generate a first power using a fuel and an oxidizer; and
a supercritical carbon dioxide ($sCO_2$) cycle system operatively connected to the fuel cell cycle to receive heat from the fuel cell cycle to cause the $sCO_2$ cycle system to generate a second power;
and a controller configured control the fuel cell cycle system and the $sCO_2$ cycle system to output a constant power and to control another power source for variable power.

* * * * *